(No Model.)
A. D. KITTLE.
SAFETY SPIKE.
No. 439,525. Patented Oct. 28, 1890.
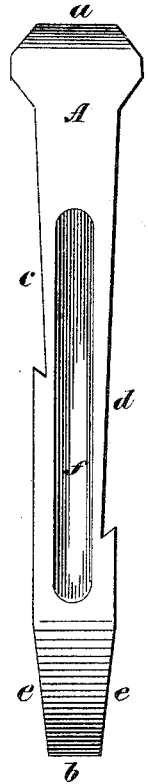
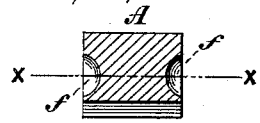
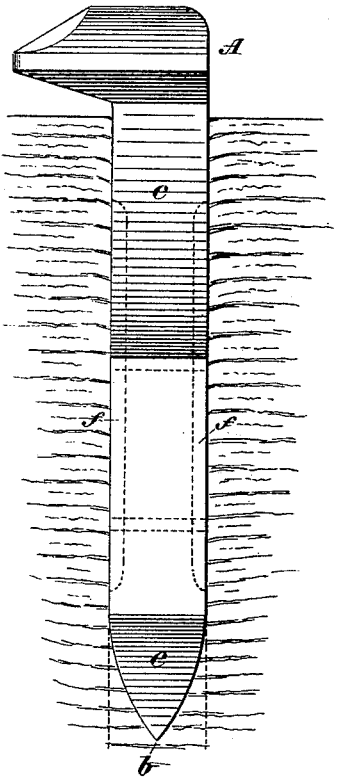
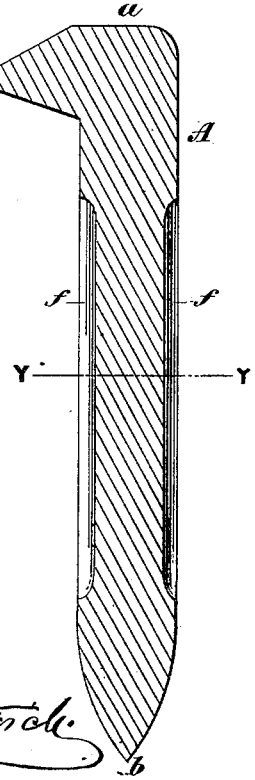
WITNESSES:
Gustave Dietrich
William Goebel
INVENTOR
Alonzo D. Kittle
By Chas. S. Williams
ATTORNEY.

UNITED STATES PATENT OFFICE.

ALONZO D. KITTLE, OF BLAUVELTVILLE, NEW YORK.

SAFETY-SPIKE.

SPECIFICATION forming part of Letters Patent No. 439,525, dated October 28, 1890.

Application filed June 5, 1890. Serial No. 354,389. (No model.)

*To all whom it may concern:*

Be it known that I, ALONZO D. KITTLE, a citizen of the United States, residing at Blauveltville, in the county of Rockland and State of New York, have invented a new and useful Safety-Spike, of which the following is a specification.

My invention relates to an improvement in a spike adapted by the construction of its shank to remain firmly fixed in the object into which it is driven.

I am aware that spikes have heretofore been constructed with projections or shoulders upon their shanks to prevent withdrawal, and I myself have invented a spike having incisions upon opposite sides of the shank, adapted to prevent its being withdrawn, for which Letters Patent of the United States have been allowed.

The object of my safety-spike is to provide a spike having upon its shank grooves or furrows whereby through the return to its normal position after compression of the grain of the wood or object into which the spike is driven the spike will remain firmly fixed, the grooves or furrows being in addition to incisions. I attain this object by the device illustrated in the accompanying drawings, in which—

Figure 1 is a rear view of the safety-spike. Fig. 2 is a side view. Fig. 3 is a section on line $x\ x$ of Fig. 4. Fig. 4 is a horizontal section of the safety-spike on the line Y Y of Fig. 3, showing the grooves or furrows $f f$.

Like letters refer to like parts throughout.

My safety-spike is provided with a head $a$, which may be a projecting or clutch head or may be any form of head which will allow the spike to be driven. Extending downward from the head $a$ is a four-sided shank A, having a point $b$. Upon each of opposite sides of the shank A is an incision $c\ d$, cut across the face of the side. These incisions $c\ d$ are cut sufficiently far down on the shank to allow them to sink well into the object into which the spike is driven, one incision being placed below the other, so as not to weaken the shank A. Each of the incisions $c\ d$ is cut across the side of the shank A at an angle less than a right angle to the plane of the side, the sides of the shank A on which the incisions $c\ d$ are cut being tapered or wedge-shaped from the head of the shank to the lowest points of the incisions. The plane of each of the incisions $c\ d$ is at right angles to the plane of the point $b$. Upon each of the other two sides of the shank A, and far enough down to sink well into the object into which the shank is driven, is cut a groove or furrow $f f$, the plane of each of these grooves or furrows being perpendicular to the plane of the point $b$.

In operation, the point $b$ of the safety-spike being driven across the grain of a wooden tie or sleeper, the grain is pushed aside or compressed by the entrance of the point $b$, and the tendency of the grain in returning to its normal position is to fill into the grooves $f f$ and close over the incisions $c\ d$, thus holding the shank firmly in place. To further facilitate the closing of the grain over the incisions $c\ d$, a slight taper $e\ e$, commencing just below the grooves $f f$ and extending downward to the point $b$, may be given the sides of the shank A upon which the incisions are cut.

Having fully described my invention, what I claim, and desire to protect by Letters Patent, is—

1. A safety-spike having a head, a shank, and a point, the shank having upon each of two opposite sides a groove, and having upon each of two other opposite sides an incision, said grooves and said incisions being adapted to hold the shank firmly in the object into which the spike is driven, substantially as described.

2. A safety-spike having a head, a four-sided shank, and a point, the shank having upon each of two opposite sides a groove or furrow commencing near the head and ending near the point, and having upon each of the other two opposite sides an incision, the plane of each of said grooves or furrows being perpendicular to the plane of the point of the spike, and the plane of each of said incisions being at right angles to the plane of the point of said spike, substantially as described.

ALONZO D. KITTLE.

Witnesses:
CHAS. E. WILSON,
EUGENE D. HAWKINS.